(12) United States Patent
Podolski et al.

(10) Patent No.: US 11,173,773 B2
(45) Date of Patent: Nov. 16, 2021

(54) TOP HAVING A TOP COVER AND A TOP LINKAGE

(71) Applicant: Webasto SE, Stockdorf (DE)

(72) Inventors: Thomas Podolski, Stockdorf (DE);
Uwe Fladung, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/715,427

(22) Filed: Dec. 16, 2019

(65) Prior Publication Data
US 2020/0198450 A1    Jun. 25, 2020

(30) Foreign Application Priority Data
Dec. 21, 2018  (DE) .................... 10 2018 133 352.8

(51) Int. Cl.
*B60J 7/12* (2006.01)
*B60J 7/20* (2006.01)

(52) U.S. Cl.
CPC ........... *B60J 7/1265* (2013.01); *B60J 7/1247* (2013.01); *B60J 7/20* (2013.01)

(58) Field of Classification Search
CPC ...... B60J 7/1265; B60J 7/1204; B60J 7/1247; B60J 7/20
See application file for complete search history.

(56) References Cited

U.S. PATENT DOCUMENTS 5,096,251 A * 3/1992 Pfertner ................ B60J 7/1265
296/116
2008/0018132 A1* 1/2008 Meinert ................ B60J 7/1265
296/99.1

FOREIGN PATENT DOCUMENTS

DE    10 2011 050 339 A1    11/2012
DE    10 2014 217 104 A1    3/2016

* cited by examiner

*Primary Examiner* — Joseph D. Pape
(74) *Attorney, Agent, or Firm* — Fitch, Even, Tabin & Flannery, LLP

(57) ABSTRACT

A convertible vehicle top, having a top cover and a top linkage displaceable between a closed position, and a storage position, the top linkage having a link assembly on either side of a vertical longitudinal center plane of the top, each link assembly having two main links pivotably mounted on a main bearing attachable to a vehicle body and which form a multi-bar linkage together with a roof middle link, and the top linkage having transverse bows via which the two link assemblies are connected. The link assemblies may each have a fabric deflection lever which is pivoted into a straightened position by the top cover when the top is in the closed position and which is pivoted into a bent position in such a manner that the top cover is deflected around the free end of the deflection lever when the top is in the storage position.

8 Claims, 5 Drawing Sheets

TOP HAVING A TOP COVER AND A TOP LINKAGE

CROSS-REFERENCE TO RELATED APPLICATION

This application claims priority from German Patent Application Number DE 10 2018 133 352.8, filed Dec. 21, 2018, which is hereby incorporated herein by reference in its entirety for all purposes.

The invention relates to a top for a convertible vehicle having the features of the preamble of claim 1.

A top of this kind is known from practice and forms a displaceable vehicle roof which can be displaced between a closed position, in which a vehicle interior is covered, and a storage position, in which the vehicle interior is uncovered and the top is accommodated in a top storage space at the rear of the vehicle. A top linkage, which serves to deploy a top cover, comprises a link assembly on either side of a vertical longitudinal center plane of the top, each link assembly comprising a main multi-bar linkage having two main links which are pivotably mounted on a main bearing attached to the vehicle body. The two main links foam a multi-bar linkage together with another roof link. Furthermore, the top linkage comprises transverse bows, across which the top cover is pulled tight when the top is in the closed position and which connect the bilaterally disposed link assemblies to each other. During displacement of the top into the storage position, the top cover is folded in a specific manner and moved into a storage position by means of control strings and/or control straps. Moreover, the storage behavior of the top cover is controlled through the transverse bows and their displacement behavior during actuation of the top linkage. However, the control of the top carried out through the control strings and/or control straps is very imprecise. Moreover, not all parts of the top cover can be folded as desired by means of the bows.

The object of the invention is to provide a top of the kind mentioned above that enables improved storage behavior of the top cover compared to the state of the art described above.

According to the invention, this object is attained by the top having the features of claim 1.

The top according to the invention comprises a fabric deflection lever on each of the bilaterally disposed link assemblies of the top linkage, the deflection levers guiding the top cover in a specific area during displacement of the top from the closed position into the storage position because the top cover is deflected around the free ends of the fabric deflection levers, whose other ends are pivotably mounted. In this way, the top cover can be prevented from becoming crumpled in said area when the top is in the storage position, for example. Instead, an exact and repeatedly precise control and positioning of the top cover between elements of the top linkage is made possible in nearly all load cases, in particular also during displacement or opening of the top cover while the convertible vehicle in question is in motion. When the top is in the closed position, the fabric deflection levers are preferably not outlined in the top cover. This can be ensured in particular if the fabric deflection levers are spaced apart from the top cover when the top is in the closed position. Moreover, the fabric deflection levers help ensure that the way in which the top cover is folded as a result leads to an aesthetic appearance when the top is in the storage position.

In a preferred embodiment of the top according to the invention, the bilaterally disposed fabric deflection levers are connected to each other via a connecting element which engages the top cover. Thus, the top cover is guided not only by the two fabric deflection levers, but also by the connecting element which connects the two fabric deflection levers and which helps determine the folding behavior of the top cover between the two fabric deflection levers.

The connecting element, which is realized as a rope or a strap in particular, may be connected to the top cover by means of an inner pocket, for example, which extends in the transverse direction of the top, the connecting element running through said pocket. Alternatively, the connecting element may be glued or sewed to the top cover.

In order to clearly define the position of the fabric deflection levers in the storage position of the top linkage, the bent position of the fabric deflection levers is preferably defined by respective stops. Moreover, movement of the fabric deflection levers may be limited by ropes, straps and/or the like.

In order to improve the appearance of the top in its storage position and to improve the folding of the top cover in the storage position, each fabric deflection lever may run through an inner loop of the top cover. The loops also serve to pull the fabric deflection levers into their bent position as the top is being displaced into the storage position.

In a specific embodiment of the top according to the invention, the link assemblies of the top linkage each comprise two front links which are hinged to the roof middle link and which serve to displace a front bow in relation to the roof middle link, each fabric deflection lever being hinged to one of the front links, in particular to the end of the front link that faces away from the roof middle link.

In a specific embodiment of the top according to the invention, the transverse bows are realized as panel bows which form an at least largely continuous support surface for the top cover in the longitudinal direction of the top when the top linkage is in the closed position.

Alternatively, the transverse bows may also be tube bows.

Other advantages and advantageous configurations of the subject-matter of the invention are apparent from the description, the drawing and the claims.

An embodiment of a top according to the invention is illustrated in a schematically simplified manner in the drawing and will be explained in more detail in the following description.

Figure 1:
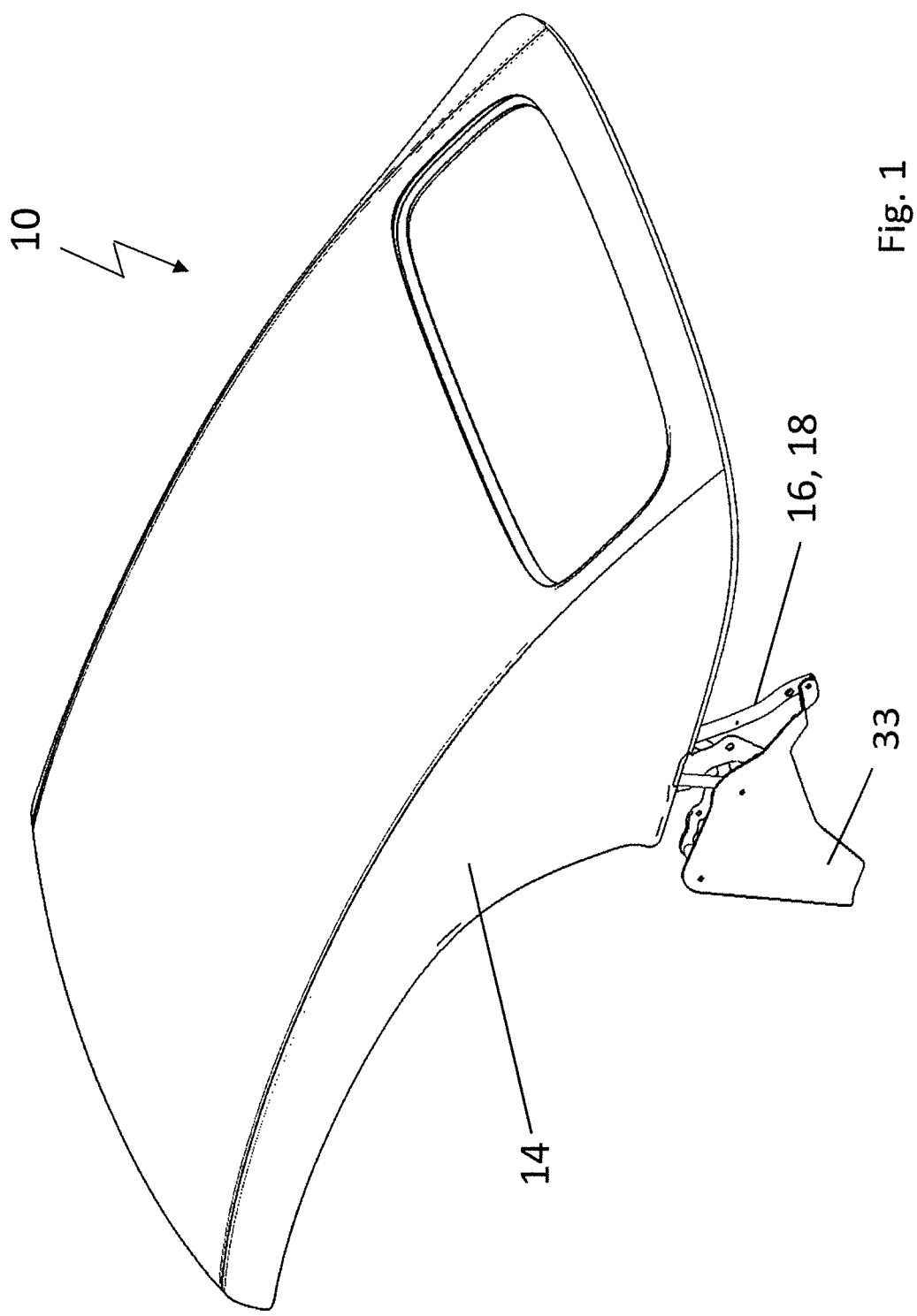
FIG. 1 is a perspective rear view of a panel bow top.

The drawing shows a top 10 of a convertible vehicle not shown in detail, the top being a folding top or, more precisely, a panel bow top. Top 10 is displaceable between a closed position, which is illustrated in FIG. 1 and in which an interior of the vehicle in question is covered, and a storage position, in which the interior of the vehicle is uncovered and top 10 is accommodated in a rear top storage box 12, which is indicated in FIGS. 4 and 5.

Figure 3:
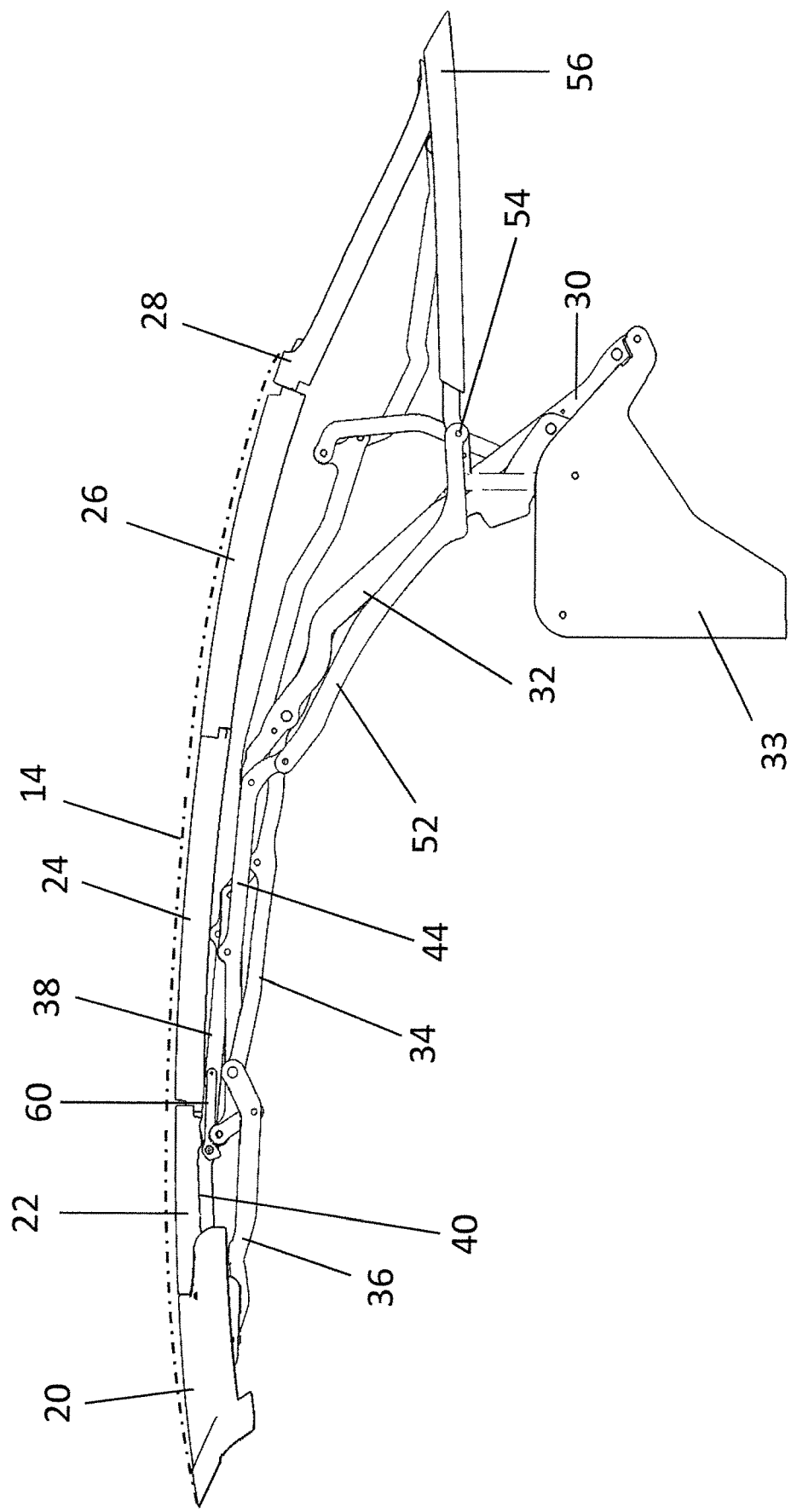
FIG. 3 is a side view of a top linkage of the top in a closed position.
Figure 4:
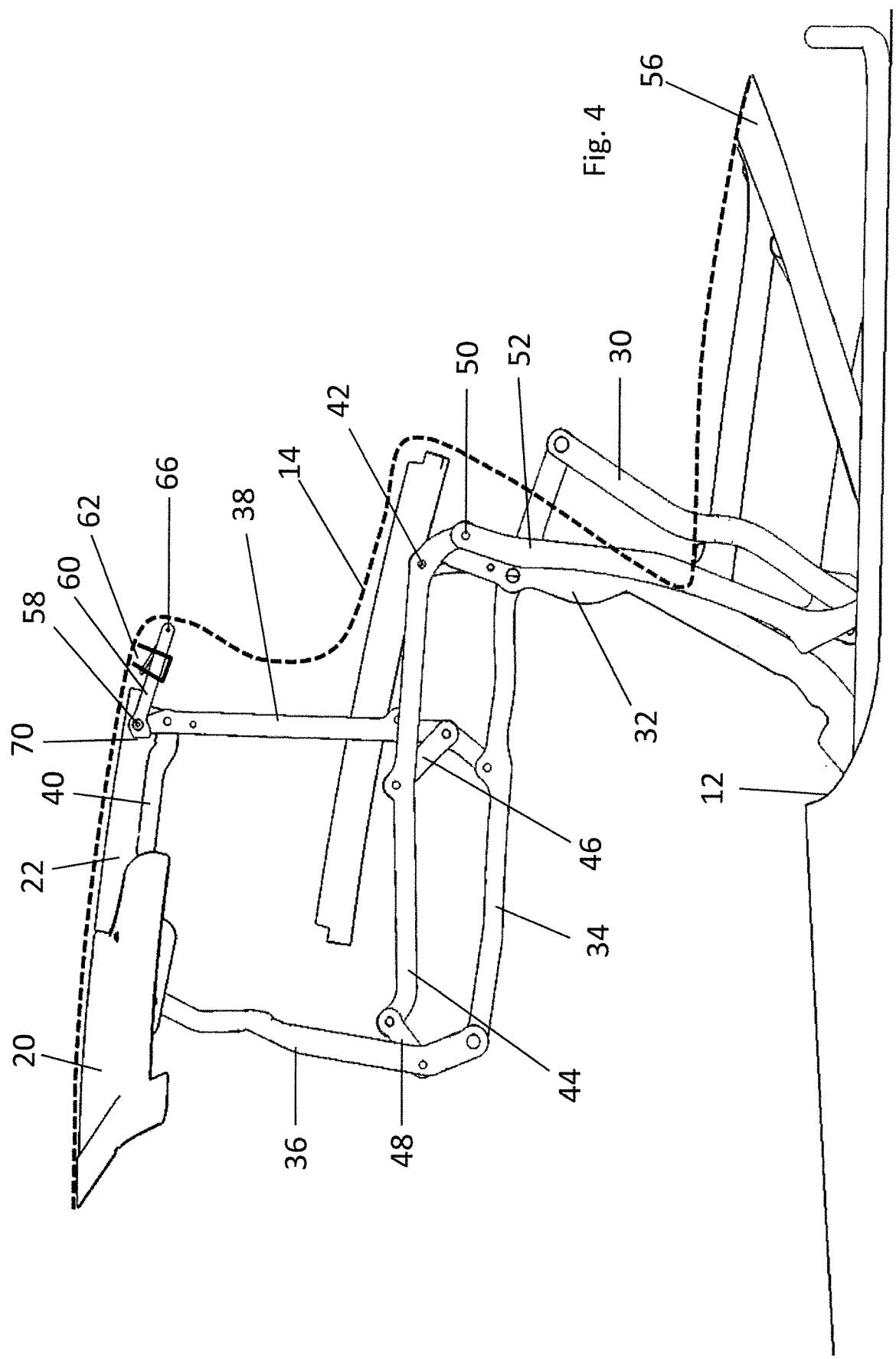
FIG. 4 is a side view corresponding to FIG. 3, showing the top linkage in an intermediate position during displacement from the closed position into a storage position.
Figure 5:
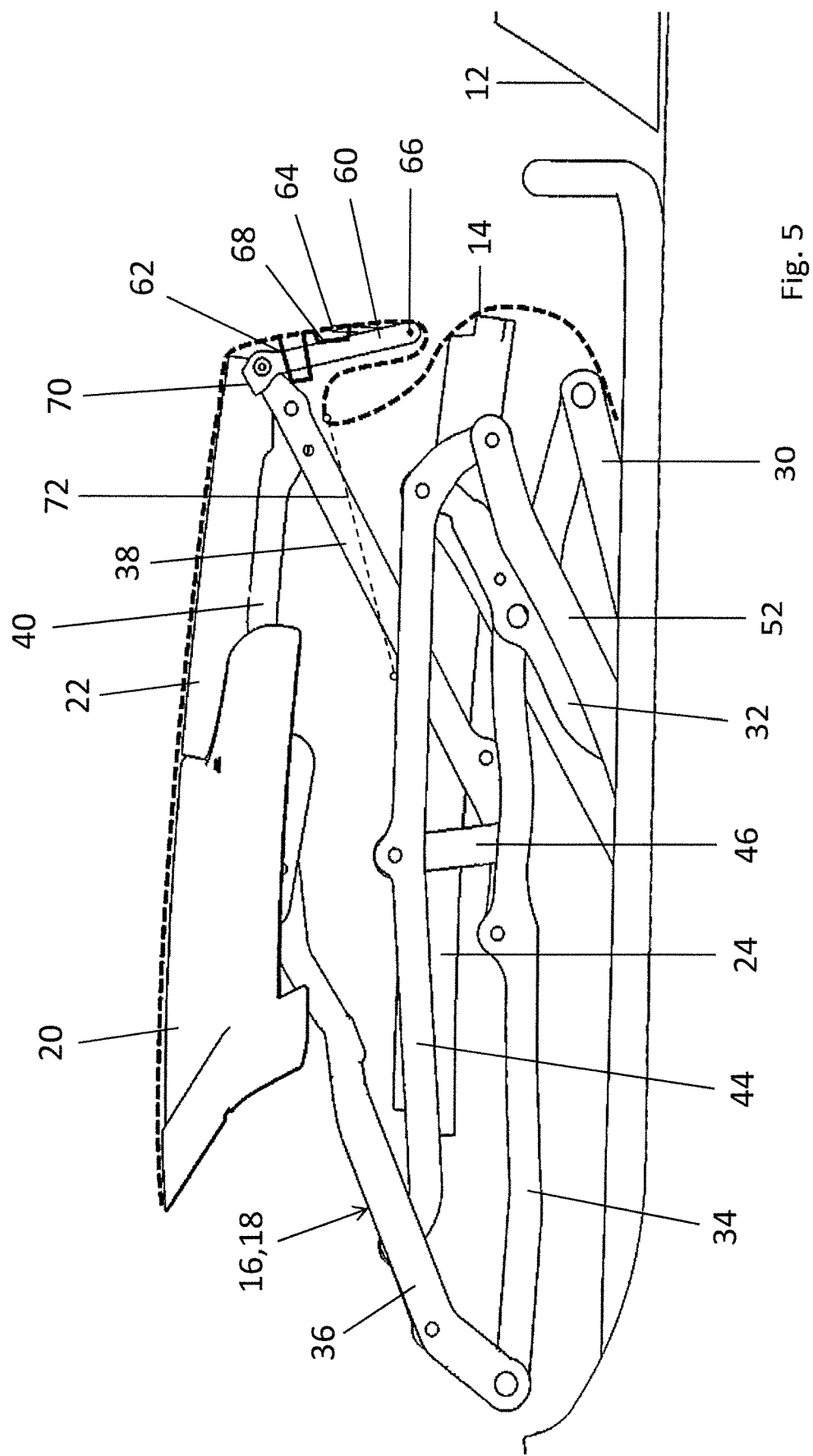
FIG. 5 is a side view of the top during displacement shortly before it reaches the storage position.

Top 10 comprises a top cover 14, which is illustrated by dashes in FIGS. 3 to 5 and which is made of a foldable waterproof fabric. For deploying top cover 14, top 10 comprises a top linkage 16 which has a link assembly 18 on either side of a vertical longitudinal center plane of top 10.

The bilaterally disposed link assemblies 18 are mirror-symmetrical with respect to the vertical longitudinal center plane of top 10, which is why the following description will be limited to the link assembly disposed on the left with respect to the direction of forward travel of the vehicle in question. The link assembly disposed on the right with respect to the direction of forward travel of the vehicle is realized analogously and, therefore, is also apparent from the following description.

Figure 2:
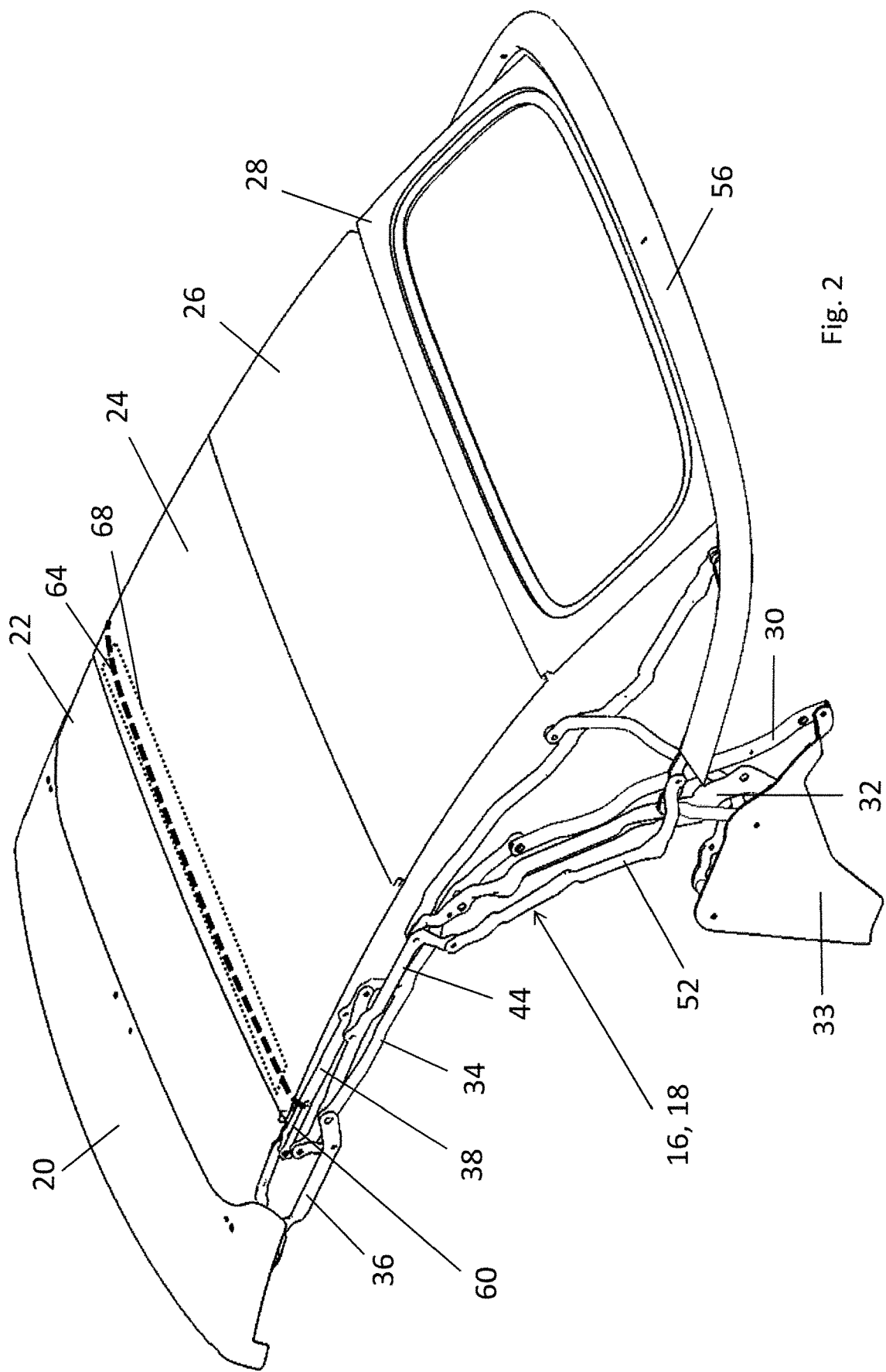
FIG. 2 is a perspective rear view of the top without illustration of a top cover.

In addition to bilaterally disposed link assemblies 18, top linkage 18 comprises a front bow 20 and four other panel bows 22, 24, 26 and 28, which are realized in the manner of rigid roof shells and form a substantially continuous support surface for top cover 14 in the longitudinal direction of the vehicle when in the closed position, which is illustrated in FIGS. 1 to 3. In the storage position, panel bows 24, 26 and 28 and the unit composed of front bow 20 and panel bow 22 are accommodated one on top of the other as a stack in top storage box 12.

The link assemblies 18 each comprise two main links 30 and 32 which are pivotably mounted on a main bearing 33 attached to a vehicle body (not shown) and which form a main multi-bar linkage or main four-bar linkage together with a roof middle link 34. Two front links 36 and 38 are hinged to roof middle link 34, the ends of front links 36 and 38 that face away from roof middle link 34 being hinged to a support 40 for front bow 22 and panel bow 24. Moreover, main link 32 is connected to a coupling link 44 via a hinge point 42, coupling link 44 serving to displace front bow 22 and panel bow 24 in relation to roof middle link 34 and being connected to the two front links 36 and 38 via respective coupling levers 46 and 48 for this purpose. At its end facing away from coupling lever 48, coupling link 44 is connected to a weather strip link 52 via a hinge point 50, the end of weather strip link 52 that faces away from coupling link 44 being connected to a rear tensioning bow 56 via a hinge point 54. Rear tensioning bow 56 delimits top cover 14 at its rear edge when top 10 is in the closed position, which is illustrated in FIGS. 1 to 3.

Via a hinge point 58, a fabric deflection lever 60 is hinged to the end of front link 38 that faces away from roof middle link 34, fabric deflection lever 60 being pivotable between a first straightened position, which is illustrated in FIG. 3 and extends in the longitudinal direction of top 10, and a second bent position, which is illustrated in FIG. 5 and associated with the storage position of top 10 and in which fabric deflection lever 60 is oriented at nearly a right angle with respect to front link 38 and top cover 14 is deflected around the free end of fabric deflection lever 60, the free end facing away from hinge point 58. In the first straightened position, which is illustrated in FIG. 3, fabric deflection lever 60 is oriented substantially parallel to front link 38 and is spaced apart from top cover 14.

Bilaterally disposed fabric deflection levers 60 run through respective loops 62 formed on the inside of top cover 14, whereby they are connected to the latter.

Furthermore, bilaterally disposed fabric deflection levers 60 are connected to each other via a rope 64 whose ends are connected to fabric deflection levers 60 via respective bores 66 and which runs through a pocket 68 formed on the inside of top cover 14 and extending in the transverse direction of top 10. Pocket 68 is shown in FIG. 2 without illustration of the other top cover areas. Alternatively, rope 64 may also be sewed or glued to top cover 14.

In order to define the bent position of fabric deflection lever 60 in the storage position of top 10, the hinged end of fabric deflection lever 60 has an angled portion which forms a stop 70 which abuts against front link 38 in the bent position.

As can be seen in FIG. 3 and was stated above, fabric deflection levers 60 are oriented substantially parallel to front links 38 when top 10 is in the closed position. In this first straightened position, they do not have a function. When top 10 is being moved from said position into its storage position, top cover 14 moves fabric deflection levers 60 in a controlled manner into their second bent position, in which they are oriented at least approximately at a right angle to front links 38 (cf. FIGS. 4 and 5). Shortly before the storage position is reached, stops 70 of fabric deflection levers 60 abut against bilaterally disposed front links 38. The second bent position of fabric deflection levers 60 causes top cover 14 to be deflected in a U-shape, which prevents top cover 14 from becoming crumpled between front links 38 and coupling links 44. The position of top cover 14 between the two fabric deflection levers 60 is predetermined by rope 64, which is stretched between the two fabric deflection levers 60 and which is connected to top cover 14 by means of pocket 68 in the case at hand. Moreover, a retaining strap 72 is connected to top cover 14, retaining strap 72 being attached to coupling link 44 at its other end and pulling top cover 14 inward in the area in question

REFERENCE SIGNS

10 top
12 top storage box
14 top cover
16 top linkage
18 link assembly
20 front bow
22 panel bow
24 panel bow
26 panel bow
28 panel bow
30 main link
32 main link
33 main bearing
34 roof middle link
36 front link
38 front link
40 support
42 hinge point
44 coupling link
46 coupling lever
48 coupling lever
50 hinge point
52 weather strip link
54 hinge point
56 tensioning bow
58 hinge point
60 fabric deflection lever
62 loop
64 rope
66 bore
68 pocket
70 stop
72 retaining strap

The invention claimed is:

1. A top for a convertible vehicle, the top comprising:
   a top cover and a top linkage displaceable between a closed position, in which a vehicle interior is covered, and a storage position, in which the vehicle interior is uncovered, the top linkage having a link assembly on either side of a vertical longitudinal center plane of the top, each link assembly comprising two main links which are pivotably mounted on a main bearing attachable to a vehicle body and which form a multi-bar linkage together with a roof middle link, and the top linkage having transverse bows via which the two link assemblies are connected to each other, wherein the link assemblies each comprise a fabric deflection lever which is pivoted into a first position by the top cover when the top is in the closed position and which is pivoted into a second position in such a manner that the top cover is deflected around a free end of the deflection lever when the top is in the storage position.

2. The top according to claim 1, wherein two bilaterally disposed fabric deflection levers are connected to each other via a connecting element which engages the top cover.

3. The top according to claim 2, wherein the connecting element runs through an inner pocket of the top cover.

4. The top according to claim 2, wherein the connecting element is a cable or a strap.

5. The top according to claim 1, wherein the second position of each fabric deflection lever is defined by a stop.

6. The top according to claim 1, wherein each fabric deflection lever runs through an inner loop of the top cover.

7. The top according to claim 1, wherein each link assembly comprises two front links which are hinged to the respective roof middle links and which serve to displace a front bow relative to the roof middle links, and wherein the fabric deflection lever is hinged to one of the front links.

8. The top according to claim 1, wherein the transverse bows are realized as panel bows and form an at least largely continuous support surface for the top cover in the longitudinal direction of the top when the top linkage is in the closed position.

* * * * *